United States Patent
Conley et al.

(10) Patent No.: US 8,470,722 B2
(45) Date of Patent: *Jun. 25, 2013

(54) BREATHABLE WATERPROOF FABRICS WITH A DYED AND WELDED MICROPOROUS LAYER

(75) Inventors: Jill A Conley, Midlothian, VA (US); Joseph Robert Guckert, Chester, VA (US); Robert Anthony Marin, Midlothian, VA (US); George Bruce Palmer, IV, Richmond, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 454 days.

This patent is subject to a terminal disclaimer.

(21) Appl. No.: 11/978,755

(22) Filed: Oct. 30, 2007

(65) Prior Publication Data

US 2008/0184453 A1 Aug. 7, 2008

Related U.S. Application Data

(60) Provisional application No. 60/856,557, filed on Nov. 3, 2006.

(51) Int. Cl.
*D03D 15/00* (2006.01)
*B32B 5/26* (2006.01)

(52) U.S. Cl.
USPC .............. 442/268; 442/181; 442/189; 2/82; 2/87; 977/762

(58) Field of Classification Search
USPC 2/82, 87; 442/85, 90, 181, 189, 268; 977/762
See application file for complete search history.

(56) References Cited

U.S. PATENT DOCUMENTS

| | | | |
|---|---|---|---|
| 3,849,241 A | 11/1974 | Butin et al. | |
| 4,526,733 A | 7/1985 | Lau | |
| 4,535,008 A | 8/1985 | Naka et al. | |
| 4,560,611 A | 12/1985 | Naka et al. | |
| 5,160,746 A | 11/1992 | Dodge, II et al. | |
| 5,204,156 A | 4/1993 | Lumb et al. | |
| 5,217,782 A | 6/1993 | Moretz et al. | |
| 6,046,119 A * | 4/2000 | Kaibe et al. | 442/76 |
| 2003/0129910 A1* | 7/2003 | Norton | 442/385 |
| 2004/0116028 A1* | 6/2004 | Bryner | 442/381 |
| 2007/0166503 A1* | 7/2007 | Hannigan | 428/59 |

FOREIGN PATENT DOCUMENTS
WO  WO 03/080905 A1  10/2003

OTHER PUBLICATIONS
U.S. Appl. No. 11/523,827, filed Sep. 20, 2006, DuPont.

* cited by examiner

*Primary Examiner* — Matthew Matzek

(57) ABSTRACT

A composite wind barrier fabric having the ability to maintain a high MVTR while controlling air permeability. The fabric has a nanofiber layer optionally welded to, and in a face-to-face relationship with, a fabric layer. Optionally a second fabric layer is welded adjacent to and in a face-to-face relationship with the nanofiber layer and on the opposite side of the nanofiber layer to the first fabric layer. The fabric has a Frazier air permeability of between about 1.2 m³/m²/min and about 7.6 m³/m²/min, and an MVTR per ASTM E-96B method of greater than about 500 g/m²/day. The nanofiber layer is dyed over at least a portion or all of its surface or both.

9 Claims, 2 Drawing Sheets

BREATHABLE WATERPROOF FABRICS WITH A DYED AND WELDED MICROPOROUS LAYER

FIELD OF THE INVENTION

This invention relates to a multi-layer moisture and water management fabric and garments incorporating such a fabric. The invention as claimed and disclosed has particular applications in outerwear.

BACKGROUND OF THE INVENTION

Protective garments for wear in rain and other wet conditions should keep the wearer dry by preventing the leakage of water into the garment and by allowing perspiration to evaporate from the wearer to the atmosphere. "Breathable" materials that do permit evaporation of perspiration have tended to wet through from the rain, and they are not truly waterproof. Oilskins, polyurethane coated fabrics, polyvinyl chloride films and other materials are waterproof but do not allow satisfactory evaporation of perspiration.

Fabrics treated with silicone, fluorocarbon, and other water repellants usually allow evaporation of perspiration but are only marginally waterproof; they allow water to leak through under very low pressures and usually leak spontaneously when rubbed or mechanically flexed. Rain garments must withstand the impingement pressure of falling and wind blown rain and the pressures that are generated in folds and creases in the garment.

It is widely recognized that garments must be "breathable" to be comfortable. Two factors that contribute to the level of comfort of a garment include the amount of air that does or does not pass through a garment as well as the amount of perspiration transmitted from inside to outside so that the undergarments do not become wet and so that the natural evaporative cooling effect can be achieved. However even recent developments in breathable fabric articles using microporous films tend to limit moisture vapor transmission if air permeability is to be controlled.

Many waterproof structures currently available comprise a multilayer fabric structure that employs the use of a hydrophobic coating. This fabric structure is typically made of a woven fabric layer, a membrane-type microporous layer, and another woven layer. The microporous layer is the functional layer of the construction that provides the appropriate air permeability and moisture vapor transmission rate necessary for the targeted application. For examples of such structures see U.S. Pat. Nos. 5,217,782; 4,535,008; 4,560,611, and 5,204,156.

The material currently in use in many waterproof and/or windproof breathable garments is an expanded PTFE (e-PTFE) microporous structure that is white in color. This material cannot be dyed and therefore produces a white edge when cut and sewn into a garment. This white edge is not acceptable in the higher-end market applications to which this microporous structure is targeted. Post-processing steps to hide the white edge must be included in the final construction of any fabric structure containing the e-PTFE.

What is needed is a microporous layer that can be dyed to match the color of the other layers in the fabric structure. This coloring can be done either during or after the production of the submicron nonwoven structure. This coloring of the microporous layer will omit any post-processing step that is done to hide a white edge.

What is also needed is a microporous layer that can be thermally bonded in order to eliminate the stitching in a fabric structure. This thermal bonding will create a completely seam-free waterproof and/or windproof structure and will eliminate any post-processing that must be done at the site of a seam in order to regain the waterproof and/or windproof functionality of a fabric structure.

While it is well known for example that e-PTFE is a desirable material for use in waterproof breathable and wind barrier fabrics in garments, the high temperature melting point and other negative aspects of e-PTFE mean that it does not readily melt at the same temperature as common textile materials such as nylon or polyester. In garments it is increasingly desirable to seam seal by thermal or ultrasonic welding techniques.

These techniques depend on the melting temperature of the materials involved. Lower melting temperatures are more amenable to these techniques. In addition, similar melting characteristics of multicomponent structures are more desirable so that the materials combine more properly within the weld.

The present invention is directed towards a layered material for a garment that provides controlled liquid water resistance in the presence of high vapor transmittance and is hence highly waterproof and is also dyeable and weldable.

SUMMARY OF THE INVENTION

In one embodiment, the invention is directed to a garment having the ability to pass moisture vapor while protecting the wearer from wind and/or water. The garment comprises a composite fabric of at least one fabric layer adjacent to and in a face-to-face relationship with a nanofiber layer. The nanofiber layer comprises at least one porous layer of polymeric nanofibers having a number average diameter between about 50 nm to about 1000 nm, a basis weight of between about 1 $g/m^2$ and about 100 $g/m^2$, and the composite fabric has a Frazier air permeability of between about 1.2 $m^3/m^2/min$ and about 7.6 $m^3/m^2/min$, and an MVTR per ASTM E-96B of greater than about 500 $g/m^2/day$, said nanofiber layer being dyed, over all or a portion of its surface.

DETAILED DESCRIPTION

Figure 1:
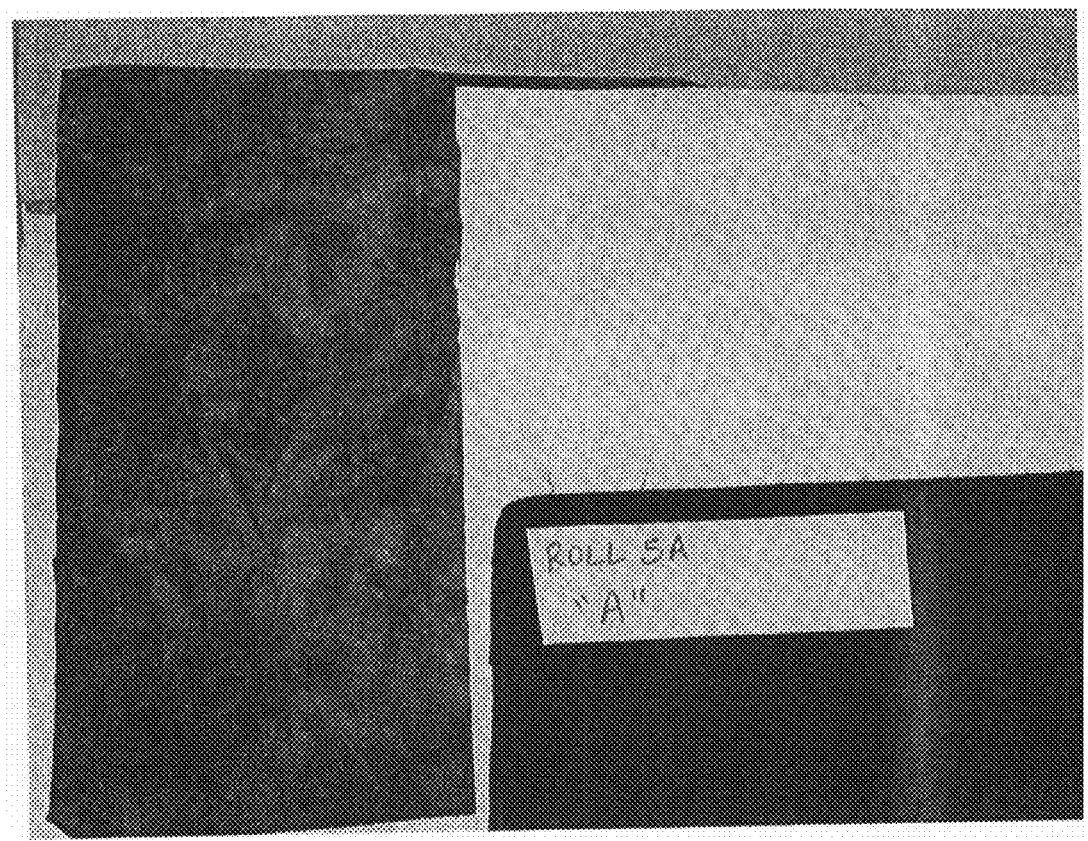
FIG. 1 shows an example of a dyed two layer fabric construction of the invention.

In one embodiment the invention comprises a nanofiber layer adjacent to a fabric layer and optionally bonded thereto over at least a fraction of its surface. The terms "nanofiber layer" and "nanoweb" are used interchangeably herein.

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

"Calendering" is the process of passing a web through a nip between two rolls. The rolls may be in contact with each other, or there may be a fixed or variable gap between the roll surfaces. Advantageously the nip is formed between a soft roll and a hard roll. The "soft roll" is a roll that deforms under the pressure applied to keep two rolls in a calender together. The "hard roll" is a roll with a surface in which no deformation that has a significant effect on the process or product occurs under the pressure of the process. An "unpatterned" roll is one which has a smooth surface within the capability of the process used to manufacture them. There are no points or patterns to deliberately produce a pattern on the web as it passed through the nip, unlike a point bonding roll.

"Meltblown fibers" are fibers formed by extruding a molten thermoplastic material through a plurality of fine, usually circular, die capillaries as molten threads or filaments into converging, usually hot and high velocity, gas, e.g. air, streams to attenuate the filaments of molten thermoplastic material and form fibers. During the meltblowing process, the diameter of the molten filaments is reduced by the drawing air to a desired size. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Buntin et al., U.S. Pat. No. 4,526,733 to Lau, and U.S. Pat. No. 5,160,746 to Dodge, II et al., all of which are hereby incorporated herein by this reference. Meltblown fibers may be continuous or discontinuous.

In one embodiment, the invention is directed to a breathable fabric having the ability to maintain a high MVTR while comprising a microporous layer that can be dyed and/or welded to the other fabrics in a garment. The fabric comprises a nanofiber layer that in turn comprises at least one porous layer of polymeric nanofibers having a basis weight of between about 1 g/m$^2$ and about 100 g/m$^2$.

The invention further comprises a first fabric layer adjacent to and in a face-to-face relationship with the nanofiber layer and optionally further comprises a second fabric layer adjacent to and in a face-to-face relationship with the nanofiber layer and on the opposite side of the nanofiber layer to the first fabric layer.

The barrier fabric of the invention further has a Frazier air permeability of between about 1.2 m$^3$/m$^2$/min and about 7.6 m$^3$/m$^2$/min, and an MVTR per ASTM E-96B method of greater than about 500 g/m$^2$/day.

The nonwoven web may comprise primarily or exclusively nanofibers that are produced by electrospinning, such as classical electrospinning or electroblowing, and in certain circumstances by meltblowing processes. Classical electrospinning is a technique illustrated in U.S. Pat. No. 4,127,706, incorporated herein in its entirety, wherein a high voltage is applied to a polymer in solution to create nanofibers and nonwoven mats. The fibers in the nonwoven web may also be melt blown fibers.

The "electroblowing" process for producing nanowebs is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

The fabric component of the invention can be arranged on the collector to collect and combine the nanoweb spun on the fabric, so that the combined fiber web is used as the fabric of the invention.

Polymer materials that can be used in forming the nanowebs of the invention are not particularly limited and include both addition polymer and condensation polymer materials such as, polyacetal, polyamide, polyester, cellulose ether and ester, polyalkylene sulfide, polyarylene oxide, polysulfone, modified polysulfone polymers and mixtures thereof. Preferred materials that fall within these generic classes include, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6,6, nylon 6,6-6,10 and the like. When the polymer nanowebs of the invention are formed by meltblowing, any thermoplastic polymer capable of being meltblown into nanofibers can be used, including polyolefins, such as polyethylene, polypropylene and polybutylene, polyesters such as poly(ethylene terephthalate) and polyamides, such as the nylon polymers. listed above.

The as-spun nanoweb of the present invention can be calendered in order to impart the desired physical properties to the fabric of the invention, as disclosed in co-pending U.S. patent application Ser. No. 11/523,827, filed Sep. 20, 2006 and incorporated herein by reference in its entirety. The as-spun nanoweb can be fed into the nip between two unpatterned rolls in which one roll is an unpatterned soft roll and one roll is an unpatterned hard roll, and the temperature of the hard roll is maintained at a temperature that is between the $T_g$, herein defined as the temperature at which the polymer undergoes a transition from glassy to rubbery state, and the $T_{om}$, herein defined as the temperature of the onset of melting of the polymer, such that the nanofibers of the nanoweb are at a plasticized state when passing through the calendar nip. The composition and hardness of the rolls can be varied to yield the desired end use properties of the fabric. One roll can be a hard metal, such as stainless steel, and the other a soft-metal or polymer-coated roll or a composite roll having a hardness less than Rockwell B 70. The residence time of the web in the nip between the two rolls is controlled by the line speed of the web, preferably between about 1 m/min and about 50 m/min, and the footprint between the two rolls is the MD distance that the web travels in contact with both rolls simultaneously. The footprint is controlled by the pressure exerted at the nip between the two rolls and is measured generally in force per linear CD dimension of roll, and is preferably between about 1 mm and about 30 mm.

Further, the nanoweb can be stretched, optionally while being heated to a temperature that is between the $T_g$ and the lowest $T_{om}$ of the nanofiber polymer. The stretching can take place either before and/or after the web is fed to the calender rolls and in either or both the machine direction or cross direction.

A wide variety of natural and synthetic fabrics are known and may be used as the fabric layer or layers in the present invention, for example, for constructing garments, such as sportswear, rugged outerwear and outdoor gear, protective clothing, etc. (for example, gloves, aprons, chaps, pants, boots, gators, shirts, jackets, coats, socks, shoes, undergarments, vests, waders, hats, gauntlets, sleeping bags, tents, etc.). Typically, vestments designed for use as rugged outerwear have been constructed of relatively loosely-woven fabrics made from natural and/or synthetic fibers having a relatively low strength or tenacity (for example, nylon, cotton, wool, silk, polyester, polyacrylic, polyolefin, etc.). Each fiber can have a tensile strength or tenacity of less than about 8 g/Denier (gpd), more typically less than about 5 gpd, and in some cases below about 3 gpd. Such materials can have a variety of beneficial properties, for example, dyeability, breathability, lightness, comfort, and in some instances, abrasion-resistance.

Different weaving structures and different weaving densities may be used to provide several alternative woven composite fabrics as a component of the invention. Weaving structures such as plain woven structures, reinforced plain woven structures (with double or multiple warps and/or wefts), twill woven structures, reinforced twill woven structures (with double or multiple warps and/or wefts), satin woven structures, reinforced satin woven structures (with double or multiple warps and/or wefts), knits, felts, fleeces and needlepunched structures may be used. Stretch woven, ripstops, dobby weaves, jacquard weaves, are also suitable for use in the present invention.

The nanoweb is welded to the fabric layers over some fraction of its surface and can be welded to the fabric layer by any means known to one skilled in the art, for example thermally or with adhesive, optionally using an ultrasonic field.

Dyes suitable for use in the practice of the present invention include any that are suitable for the polymer or polymers that the nanoweb comprises. Without intending to limit the invention by choice of dye, acid dyes such as the following Color Index (C.I.) dyes can be used: Acid Yellows 24, 40, 59, 159, 184, 204, and 246, Acid Oranges 142 and 156, Acid Reds 50, 51, 52, 138, 151, 299, 361, 362, Acid Greens 104 and 108, Acid Blues 113, 171, 185, 193, 277, and 324, Acid Violet 90, Acid Brown 298, Acid Blacks 52, 131:1, 132:1, 172, 187, and 194. In addition, the following non-Color Index dyes may be employed: Lanaset Blue 2R, Lanaset Navy R, Lanaset Red G, Lanaset Red 2GA, Lanaset Violet B, Lanaset Brown B, Burconyl Brick Red AF-3b, Burconyl Rubine AF-GR, Burconyl Orange AF-3R, Burconyl Green AF-B, Burconyl Brilliant Blue AF-R, Burconyl Royal Blue AF-R, Burconyl Brilliant Yellow AF-4G, Erionyl Red A-3G, Erionyl Blue RL 200, and Nylanthrene Brilliant Blue 2RFF.

Manufacturers also supply dyes in mixtures of pure forms. Mixtures may be employed in the practice of the invention and may be preferable to the pure form of the dyestuffs for reasons related to the shade desired and/or performance properties. For example, a mixture of CI Acid Red 337 and CI Acid Red 426 provides a bluish red acid dye mixture that has similar dyeing behavior in composition to CI Acid Red 337 when used as the red component in typical dyeing systems for nylon, but the mixture of CI Acid Red 337 and CI Acid Red 426 can provide improved lightfastness as compared to dyeings using the Acid Red 337 alone as the red component.

Preferably, the blue component of a dye mixture used in the practice of the invention comprises one or more of a dye selected from the group consisting of: Acid Blue 25; Acid Blue 40; Acid Blue 41, Acid Blue 78; Acid Blue 129; Acid Blue 205; Acid Blue 260; Acid Blue 277; Acid Blue 288; Acid Blue 324; Acid Green 25, or a mixture thereof. In a particularly preferred embodiment, the blue component comprises Acid Blue 324.

Preferably, the red component used in the practice of the invention comprises one or more of a dye selected from the group consisting of: Acid Red 42; Acid Red 57; Acid Red 257; Acid Red 266; Acid Red 337; Acid Red 361; Acid Red 396; Acid Red 426, or a mixture thereof. In a particularly preferred embodiment, the red component comprises Acid Red 337, Acid Red 426, Acid Red 361, or a mixture thereof.

The yellow component used in the practice of the invention can further include one or more of dyes selected from the group consisting of Acid Yellow 49; Acid Yellow 135; Acid Yellow 159; Acid Yellow 159:1; Acid Yellow 174; Acid Yellow 198; Acid Yellow 216; Acid Yellow 219:1; Acid Yellow 230; Acid Yellow 240; Acid Orange 47; Acid Orange 67; Acid Orange II 16; Acid Orange 152, or a mixture thereof.

The invention will now be illustrated by the following specific examples:

EXAMPLES

In Example 1, a two-layer fabric construction made from a nylon ripstop (basis weight of 100 gsm) and a nanoweb made from Nylon 6,6 was produced. The two-layer fabric construction was produced by laminating the nylon ripstop fabric to the nanoweb using a solvent-based urethane adhesive using a "288-pattern" gravure-roll application with a pressure of 60 psi. The final two-layer fabric construction was then dyed using the Atmospheric procedure from Aakash Chemicals & Dye-stuffs, Inc number 53-1110 and is shown in FIG. 1.

Figure 2:
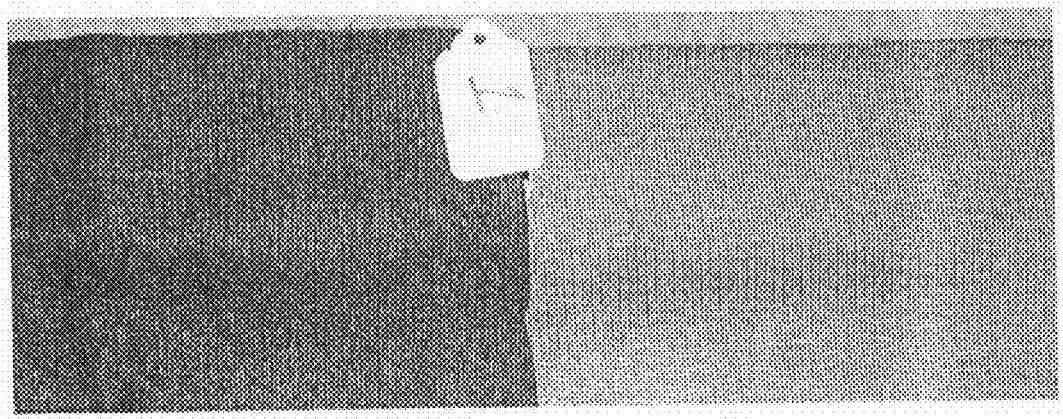
FIG. 2 shows an example of a dyed three layer fabric construction of the invention.

In Example 2, a three-layer fabric construction was made from a nylon ripstop (basis weight of 100 gsm), a nanoweb made from Nylon 6,6, and a nylon tricot material (basis weight of 35 gsm) using a solvent-based urethane adhesive using a "288-pattern" gravure-roll application with a pressure of 60 psi. The final three-layer fabric construction was then dyed using the Atmospheric procedure from Aakash Chemicals & Dye-stuffs, Inc number 53-1110 and is shown in FIG. 2.

We claim:

1. A garment having the ability to pass moisture vapor while protecting the wearer from wind and/or water comprising a composite fabric of at least one woven fabric layer adjacent to and in a face-to-face relationship with a nanofiber layer, wherein the nanofiber layer comprises at least one porous layer of continuous, polymeric nanofibers having a number average diameter less than 1000 nm to about 50 nm, a basis weight of between about 1 g/m$^2$ and about 100 g/m$^2$, and wherein the composite fabric has a Frazier air permeability of between about 1.2 m$^3$/m$^2$/min and about 7.6 m$^3$/m$^2$/min, and a moisture vapor transmission rate per ASTM E-96B of greater than about 500 g/m$^2$/day said nanofiber layer being dyed, over all or a portion of its surface, and wherein the continuous polymeric nanofibers are not meltblown fibers.

2. The garment of claim 1 in which the nanofiber layer is produced by electrospinning or electroblowing.

3. The garment of claim 1 in which the nanofiber layer comprises polymer from a class selected from the group consisting of polyacetals, polyamides, polyesters, cellulose ethers, cellulose esters, polyalkylene sulfides, polyarylene oxides, polysulfones, modified polysulfone polymers and mixtures thereof.

4. The garment of claim 1 in which the nanofiber layer comprises polymer from the group consisting of poly(vinylchloride), polymethylmethacrylate, polystyrene, and copolymers thereof, poly(vinylidene fluoride), poly(vinylidene chloride), polyvinylalcohol in crosslinked and non-crosslinked forms.

5. The garment of claim 3 in which the nanofiber layer comprises polymer from the group consisting of nylon-6, nylon-6,6, nylon 6,6-6,10.

6. The garment of claim 1 in which the nanofiber layer is calendered.

7. The garment of claim 6 in which the nanofiber layer is calendered while in contact with the woven fabric layer.

8. The garment of claim 1 in which the woven fabric is woven from a material selected from the group consisting of nylon, cotton, wool, silk, polyester, polyacrylic, polyolefin and combinations thereof.

9. The garment of claim 1 in which the woven fabric is woven from fibers that have a tenacity of less than about 8 g/Denier.

\* \* \* \* \*